May 30, 1939.  L. E. LA BRIE  2,160,075
MASTER CYLINDER FOR HYDRAULIC BRAKES
Filed Sept. 9, 1935  3 Sheets-Sheet 1
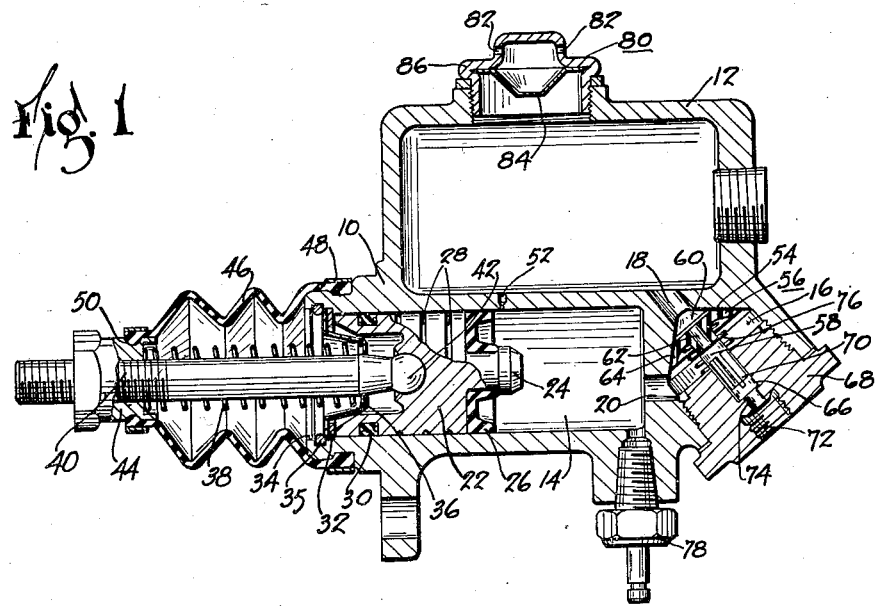
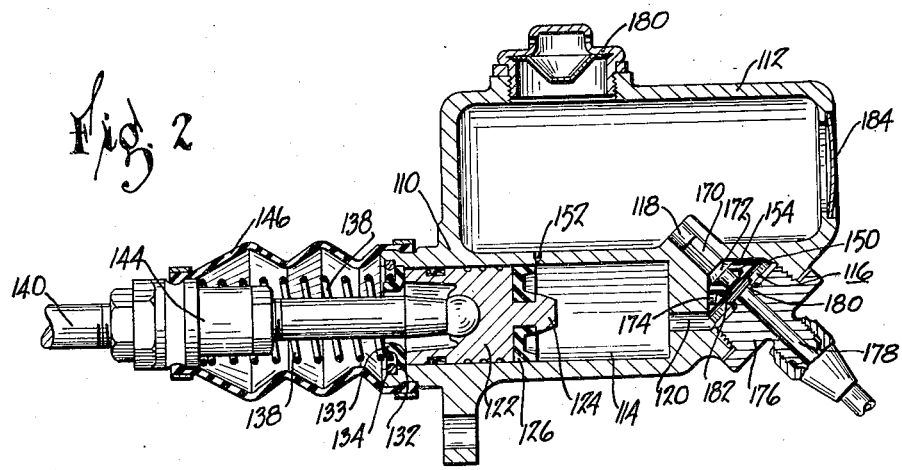
INVENTOR.
LUDGER E. LABRIE
BY 
ATTORNEY.

May 30, 1939.  L. E. LA BRIE  2,160,075
MASTER CYLINDER FOR HYDRAULIC BRAKES
Filed Sept. 9, 1935  3 Sheets-Sheet 2
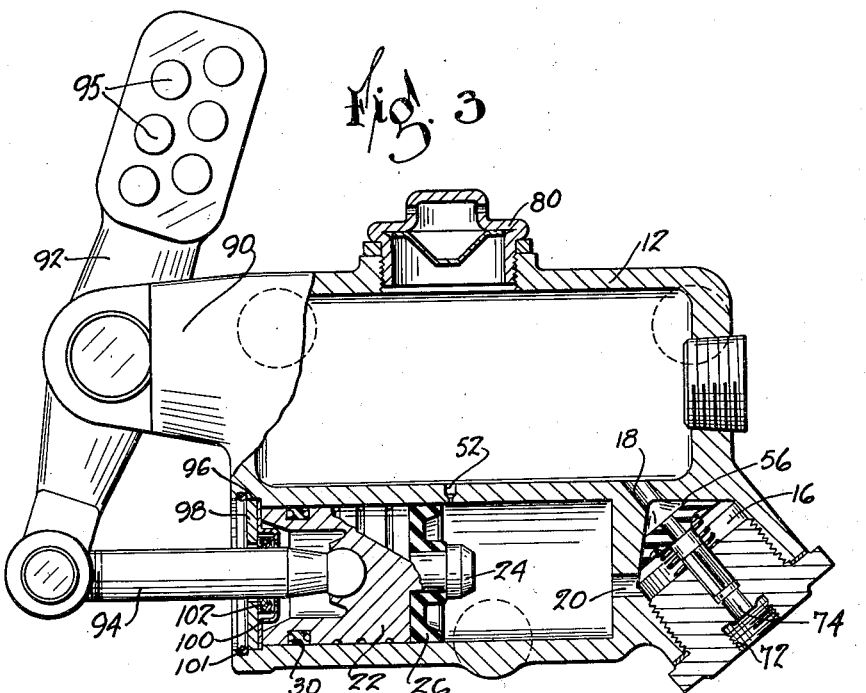
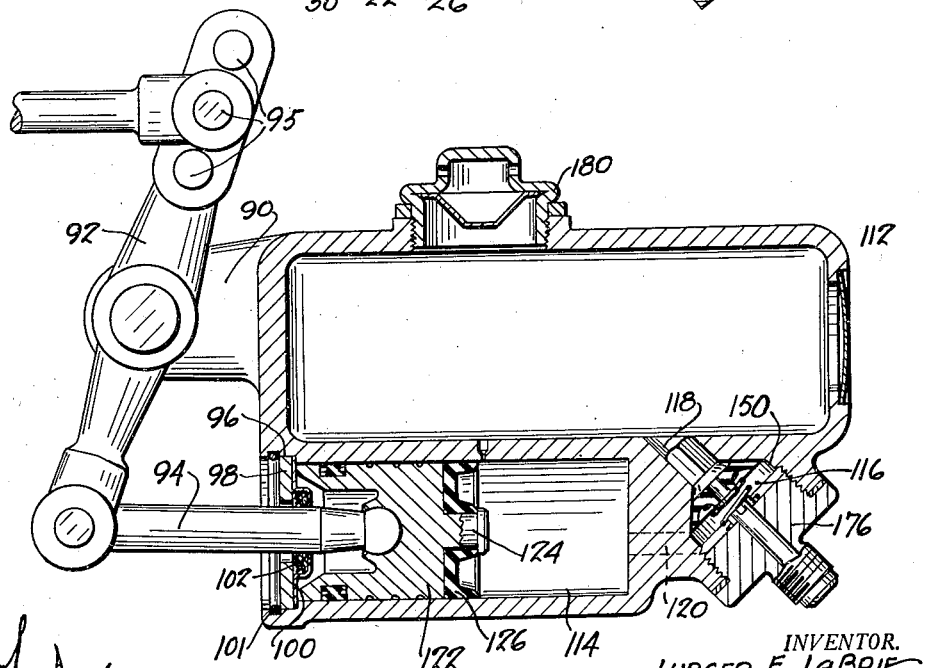
INVENTOR.
LUDGER E. LaBRIE
BY
ATTORNEY May 30, 1939.　　　　L. E. LA BRIE　　　　2,160,075
MASTER CYLINDER FOR HYDRAULIC BRAKES
Filed Sept. 9, 1935　　　3 Sheets-Sheet 3

INVENTOR.
LUDGER E. LaBRIE
BY
ATTORNEY

Patented May 30, 1939

2,160,075

UNITED STATES PATENT OFFICE 2,160,075

MASTER CYLINDER FOR HYDRAULIC BRAKES

Ludger E. La Brie, South Bend, Ind., assignor to Bendix Products Corporation, South Bend, Ind., a corporation of Indiana Application September 9, 1935, Serial No. 39,735

4 Claims. (Cl. 60—54.6)

This invention relates to hydraulic control systems, and more particularly to the construction and arrangement of master cylinders for use in such control systems, and particularly adapted for use in automotive vehicle hydraulic brake systems.

The present invention is particularly directed to a hydraulic brake master cylinder having special means associated therewith for preventing the possible occurrence of vacuum conditions in the brake system upon the return or suction stroke of the master cylinder, by permitting the easy inflow of fluid from the reservoir into the master cylinder through some form or arrangement of check valve.

Accordingly, an object of the invention is to provide a master cylinder for use in hydraulic control systems having means associated therewith for preventing the occurrence of sub-atmospheric pressures in the system on the suction stroke.

Another object of the invention is to provide in a master cylinder, a direct connection to the reservoir so that on return or suction stroke of the master cylinder any tendency to produce a vacuum in the system will be satisfied by the direct and prompt inflow of fluid from the reservoir.

A further object of the invention is to provide in a hydraulic brake system a master cylinder having a direct connection to a reservoir with a check valve interposed therein so as to interrupt such connection on the compression stroke.

A still further object of the invention is to provide a hydraulic brake master cylinder of the above type which shall be of simple construction, rugged in operation and economical to manufacture.

The above and other objects and novel features of the invention will appear more fully hereinafter from the following detailed description when taken in conjunction with the accompanying drawings illustrating various modified forms of the invention. It is expressly understood, however, that the drawings are employed for purposes of illustration only and are not designed as a definition upon the limits of the invention, reference being had for this purpose to the appended claims.

In the drawings wherein similar reference characters indicate similar parts throughout the several views:

Fig. 1 is a longitudinal section through one form of the invention showing the master cylinder, reservoir and parts associated therewith;

Fig. 2 is a longitudinal section of a slightly modified form of a master cylinder showing the invention;

Fig. 3 is a longitudinal section of a master cylinder modified from that of Fig. 1 and having an operating lever fulcrumed on the casing;

Fig. 4 is a longitudinal section of a master cylinder modified somewhat over that of Fig. 3;

Figure 5:
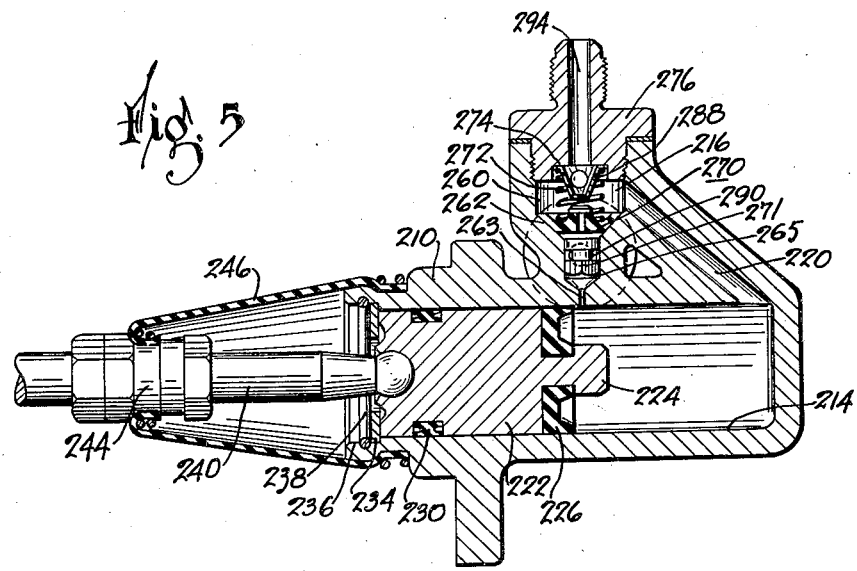
Fig. 5 is a longitudinal section through a form of master cylinder embodying the invention but adapted to be connected to a separate reservoir.

Referring to the drawings and more particularly Fig. 1, there is illustrated a master cylinder casing 10 having a reservoir 12, master cylinder bore 14 located thereunder, and a check valve chamber 16 having ports 18 and 20 leading to the reservoir and cylinder respectively.

The cylinder bore is provided with a piston 22 having a forward knob bumper 24 about which is positioned an annular cup washer 26, the knob forming a means for limiting the forward stroke of the piston. The piston is also provided with annular oil grooves 28 and an annular washer 30 set in an annular groove near the back of the piston. The normal position or return movement of the piston is limited by an annular disc 32 set in an enlarged groove 34 in the back of the cylinder. A locking ring 34 holds the annular disc in place and in addition retains an annular cup-shaped member 36 which is adapted to carry one end of a return spring 38. A piston rod 40 is swivelly connected to the piston as at 42 and is provided at its outer end with a threaded collar 44. The aforementioned spring 38 is positioned around the rod 40 and is compressed between the annular cup member 36 and the collar 44. A flexible boot 46 is secured in an annular groove 48 on the outside wall of the cylinder casing and also in an annular groove 50 in the threaded collar and prevents the entrance of dirt and foreign matter into the back end of the cylinder. A compensating port 52 is provided between the reservoir 12 and cylinder bore 14 just forward of the return stroke position of the annular cup washer 26.

The check valve chamber 16 which consists of a cylindrical bore with a conical inner end 54 is arranged at one end of the cylinder and the apex of the conical bore 54 is connected to the reservoir 12 by means of the passage 18. The cylindrical portion of the chamber is connected to the cylinder bore through a port 20. Adapted to seat upon the conical surface 54 is a check valve 56 which comprises a stem member 58 having a head 60 and an annular reduced portion 62 in the stem adjacent the head. A conical washer 64 is threaded on the stem and seated on the annular reduced portion 62 and against the head 60. The valve stem is guided in a central bore 66 located in a screw plug 68 adapted to be threaded into the cylindrical part of the valve chamber, and the valve stem 58 is fluted as at 70 to permit passage of fluid through the central bore 66 and to a discharge conduit, not shown, which may be fitted into the threaded recess 72 and the end of the plug 68.

The central bore 66 may be restricted more or less as shown at 74 so that, upon the return stroke of the piston, liquid may preferably be drawn from the reservoir through the check valve rather than from the discharge conduit, thereby preventing sub-atmospheric pressure from being developed in the discharge conduit. A light spring 76 which is threaded on the valve stem 58 is adapted to hold the check valve normally on its seat. An electric stop-light switch 78 is shown in communication with the cylinder bore so that pressures developed therein during braking may be used to operate a suitable electric signal.

The top of the reservoir 12 is provided with a screw filler plug 80 having breathing ports 82 and an apertured baffle 84 located adjacent thereto to prevent splashing of the liquid through the port 82. The plug shown may be made from formable sheet metal and the baffle 84 may be held in place in an annular pocket 86 provided during the forming process.

The modified form of the invention shown in Fig. 2 comprises a master cylinder casing 110 having a reservoir 112, master cylinder bore 114, and check valve chamber 116, the latter being connected to the reservoir and bore by ports 118 and 120 respectively.

A piston 122 having a forward annular cup washer 126 and bumper 124 is reciprocably mounted in the cylinder bore 114, and its return stroke position is determined by a washer 132 outwardly flanged along its inner edge as at 133, the washer being seated in an enlarged recess in the back of the cylinder and locked in place by a ring 134. A piston rod 140 swively secured to the piston is provided having an adjustable shouldered collar 144, carrying one end of a flexible boot 146, the other end of which is secured to the outside wall of the end of the cylinder. Around the piston rod is a return spring 138 compressed between the washer 132 and the collar 144, the spring being centered on the flange 133 of the washer.

The check valve chamber, as in Fig. 1, comprises a cylindrical bore 150 connected through port 120 to the cylinder, and a conical end 152, the apex of the conical surface being connected through port 118 to the reservoir. A conical valve comprising a fluted stem 170 slidably mounted in the port 118 for guiding is provided with a head 172 adapted to carry a conical washer 174. An end plug 176 threaded into the valve chamber is provided with a discharge port 178, and carries on its forward face a boss 180 for receiving and centering a light spring 182 bearing against the valve washer 174.

The reservoir is provided with a compensating port 152 leading to the cylinder bore just forward of the return stroke position of the cup washer 126. Also the reservoir is provided with a filler cap 180, and a seal 184 for a core hole preferably provided during casting.

The modifications of Figs. 3 and 4 are greatly similar to those of Figs. 1 and 2 respectively with the exception that the flexible boot employed in Fig. 1 and for preventing entrance of dirt and dust has been dispensed with in lieu of a washer type construction more suitable for use in connection with the fulcrumed lever shown.

In Fig. 3 for example, the cylinder, reservoir and check valve construction is the same as Fig. 1, except that the cylinder casing carries a fulcrum 90 on one side thereof in which is carried a lever 92 the lower end of which is secured to the piston rod 94. The upper end of the lever 92 is provided with a series of holes 95 particularly adapted for adjustment. To prevent entrance of dirt and foreign matter, the open end of the cylinder is provided with an annular groove 96 carrying a washer 98 and annularly flanged packing carrying member 100, the same being held in place by a lock ring 101. Located between the washer 98 and member 100 is an annular packing material 102 adapted to snugly but slidably embrace the piston rod 94. A similar arrangement is illustrated in Fig. 4, however the structure of Fig. 4 aside from the lever and cylinder end structure conforms to that of Fig. 2.

Figure 6:
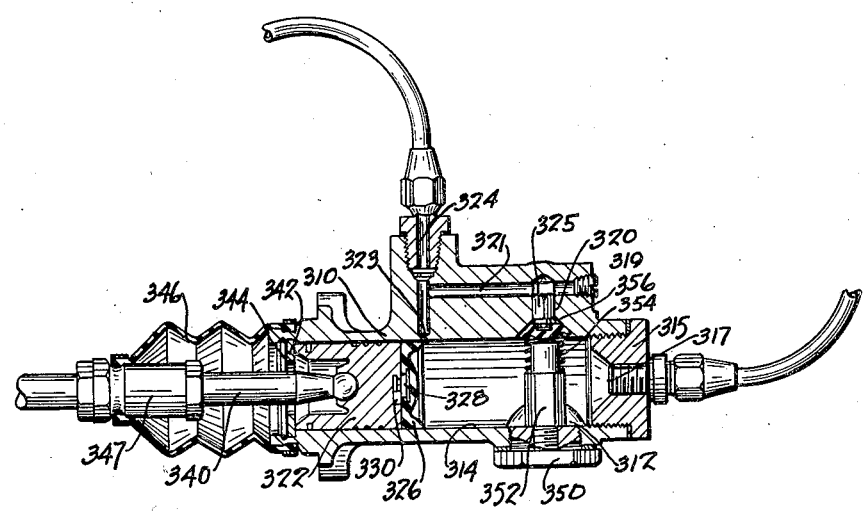
Fig. 6 is a longitudinal section of a modified form of the type illustrated in Fig. 5.

Referring to the modified forms of the invention illustrated in Figs. 5 and 6, master cylinders of the type adapted for positioning remote from the reservoir are shown. In Fig. 5, the casing 210 comprises a cylinder bore 214 and check valve chamber 216 located thereabove. The cylinder bore 214 contains therein a piston 222 having an annular cup washer 226 carried on a central knob 224 on the forward end of the piston. The piston is also provided with a rear washer 230 and a return stroke limiting means comprising an annular disc 234 set in an annular recess 236 in the mouth of the cylinder bore, and locked in place by a ring 238. The piston also has a piston rod 240 swively secured thereo, the rod having an adjustable collar 244, carrying a flexible boot 246 secured thereto and the exterior of the rear end of the cylinder.

The check valve chamber comprises a cylindrical bore 260 terminating in a conical valve seat 262, the apex of which is connected to the cylinder bore by a compensating port 263, just forward of the release position of the piston washer 226. The cylindrical bore portion of the chamber is provided with a port 220 extending to the inner end of the cylinder. A conical check valve 270 having a downwardly-extending stem 271 guidably carried in an enlarged portion 265 of the compensating port 263 is held on its seat by a light spring 272 centered around the upper end of the valve stem and in a recess 274 formed on the under inner surface of the plug 276 threaded in the cylindrical portion of the valve chamber. The spring may be seated on a conical perforated guide stamping 288 forming a guide against collapsing of the spring and also forming a bumper limiting the movement of the check valve.

Connection to any suitable reservoir is made to a bore 290 extending into the enlarged portion 265 of the compensating port, and the cylinder discharge or motor cylinder line is connected to the central bore 294 of the plug 276.

In the modification of the invention disclosed in Fig. 6, the check valve chamber is illustrated as formed in the end of the cylinder bore. The cylinder casing 310 is provided with the cylinder bore 314, the same being closed at one end by a plug 315 having a discharge port 317 therein. Adjacent the discharge end of the cylinder bore is an intersecting vertical bore 312 forming a check valve chamber. The upper end of this bore, above the wall of the cylinder bore 314, is provided with a conical valve seat 319 the apex of which is connected by ports 320 and 321 to a connection 324 adapted to lead to a fluid reservoir. The lower end of the bore emerges from the casing and is provided with a screw plug 350 upon which is carried a shouldered inwardly-extending stud 352 adapted to carry a spring 354 urged against a conical valve 356 arranged for engagement with the conical valve seat 319. The valve is provided with a fluted stem 321 adapted to extend upwardly into the port 320 and be slidably guided thereby.

The remainder of the cylinder comprises the usual master piston 322 with a cup washer 326 carried on its forward end, the same being snapped over a shoulder pin 328. The forward face of the piston 322 is provided with an eccentric keyhole slot 330 adapted to receive a second shoulder on the pin 328, which shoulder when seated in the slot and positioned concentric is firmly held in place.

The rear of the piston is provided with the usual piston rod 340, stop washer 342 and lock ring 344 together with a flexible boot 346 attached to a collar 347 on the rod 340 and cylinder casing. The collar 347 may be adjustably positioned on the rod so as to abut the stop washer 342 and thus limit the forward stroke of the piston. The ports 320, 321 and 324 leading to the reservoir are also connected by a compensating port 323 to the interior of the cylinder bore at a point just forward of the return position of the piston.

The operation of the various forms of the invention will appear from the foregoing description, it being obvious that upon a forward stroke of the master piston fluid is ejected through the discharge port to the motor or wheel cylinders. Upon return stroke the check valve opens to supply fluid directly from the reservoir to offset any deficiency which might result in vacuum conditions in the line. The fluid thus temporarily borrowed from the reservoir is subsequently returned to the reservoir as fast as the wheel or motor cylinders by their return springs are able to force fluid back to the master cylinder. Thus a pressure condition is maintained in the line at all times obviating any chance of drawing air into the line as a result of vacuum conditions.

Although several embodiments of the invention have been illustrated and described, it is to be understood that the invention is not limited thereto but may be embodied in other mechanical arrangements and forms. For example, the various features of any one of the modifications might be substituted for those of the other modifications. As such and other changes in construction and arrangement may be made without departing from the spirit of the invention as will be apparent to those skilled in the art, reference will be had to the appended claims for a definition of the limits of the invention.

What is claimed is:

1. A hydraulic brake master cylinder comprising a casing having a reservoir in the top thereof and a cylinder bore therebelow, and a valve chamber of cylindrical shape with a conical upper end diagonally arranged beneath said reservoir and beyond the end of said cylinder bore, said valve chamber having a port from the conical end of the chamber to said reservoir and having a second port by which it is connected to the cylinder bore, a plug threaded into said chamber having a central discharge port, and a valve adapted to seat on said conical end and having a fluted stem slidable in said discharge port.

2. A hydraulic brake master cylinder comprising a casing having a reservoir on the top thereof and a cylinder bore therebelow, and a valve chamber of cylindrical shape with a conical upper end diagonally arranged beneath said cylinder and beyond the end of said cylinder bore, said valve chamber having a port from the conical end of the chamber to said reservoir and having a second port by which it is connected to the cylinder bore, a plug threaded into said chamber having a central discharge port, a valve adapted to seat on said conical end and having a fluted stem slidable in said discharge port, and a spring interposed between said valve and said plug.

3. A hydraulic brake master cylinder comprising a casing having a reservoir on the top thereof and a cylinder bore therebelow, and a valve chamber of cylindrical shape with a conical upper end diagonally arranged beneath said cylinder and beyond the end of said cylinder bore, said valve chamber having a port from the conical end of the chamber to said reservoir and having a second port by which it is connected to the cylinder bore, a plug threaded into said chamber having a central discharge port, a valve adapted to seat on said conical end, and a spring interposed between said valve and said plug.

4. A hydraulic brake master cylinder comprising a casing having a reservoir on the top thereof and a cylinder bore therebelow, and a valve chamber of cylindrical shape with a conical upper end diagonally arranged beneath said cylinder and beyond the end of said cylinder bore, said valve chamber having a port from the conical end of the chamber to said reservoir and having a second port by which it is connected to the cylinder bore, a plug threaded into said chamber having a central discharge port, and a valve adapted to seat on said conical end.

LUDGER E. LA BRIE.